United States Patent
Veeraraghavan et al.

(10) Patent No.: US 12,415,933 B2
(45) Date of Patent: Sep. 16, 2025

(54) NON-AQUEOUS SPRAYABLE AND CURABLE DAMPENING COMPOSITIONS FOR AUTOMOTIVE BODY AND CLOSURE PANELS AND ASSOCIATED METHODS FOR CURING AND USING THE SAME

(71) Applicants: Thanikaivelan Tindivanam Veeraraghavan, Newburgh, IN (US); Karthikeyan Sengotaiyan, Newburgh, IN (US); Senthilkumar Veeraraghavan, Newburgh, IN (US)

(72) Inventors: Thanikaivelan Tindivanam Veeraraghavan, Newburgh, IN (US); Karthikeyan Sengotaiyan, Newburgh, IN (US); Senthilkumar Veeraraghavan, Newburgh, IN (US)

(73) Assignee: Uniseal, Inc., Evansville, IN (US)

( * ) Notice: Subject to any disclaimer, the term of this patent is extended or adjusted under 35 U.S.C. 154(b) by 243 days.

(21) Appl. No.: 18/230,272

(22) Filed: Aug. 4, 2023

(65) Prior Publication Data

US 2025/0043144 A1    Feb. 6, 2025

(51) Int. Cl.
| | |
|---|---|
| *C09D 127/06* | (2006.01) |
| *C08K 5/09* | (2006.01) |
| *C08L 27/06* | (2006.01) |
| *C09D 7/61* | (2018.01) |
| *C09D 7/63* | (2018.01) |

(52) U.S. Cl.
CPC .......... *C09D 127/06* (2013.01); *C08L 27/06* (2013.01); *C09D 7/61* (2018.01); *C09D 7/63* (2018.01); *C08L 2205/025* (2013.01); *C08L 2205/03* (2013.01); *C08L 2205/035* (2013.01)

(58) Field of Classification Search
CPC ............................ C09D 127/06; C08K 5/092
See application file for complete search history.

(56) References Cited

U.S. PATENT DOCUMENTS

| | | | |
|---|---|---|---|
| 3,420,729 A | * | 1/1969 | Roberts ............ B29C 63/26 264/250 |
| 3,894,169 A | | 7/1975 | Miller |
| 4,133,932 A | | 1/1979 | Peck |
| 4,851,271 A | | 7/1989 | Moore, III et al. |
| 4,883,717 A | | 11/1989 | Kitamura et al. |
| 5,213,879 A | | 5/1993 | Niwa et al. |
| 5,350,610 A | | 9/1994 | Mashita et al. |

(Continued)

FOREIGN PATENT DOCUMENTS

WO    WO 99/058597    11/1999

OTHER PUBLICATIONS

PCT Written Opinion and International Search Report of the International Searching Authority for International Application No. PCT/US23/029475 mailed May 1, 2024.

*Primary Examiner* — Cachet I Proctor
(74) *Attorney, Agent, or Firm* — King & Partners, PLC

(57) ABSTRACT

A non-aqueous sprayable and curable dampening composition for automotive body and closure panels which cures to form a cured product, including: (1) a PVC homopolymer resin and/or a mixture of a PVC copolymer resin; (2) a phthalate plasticizer and a benzoate plasticizer; (3) a filler component, wherein the filler component comprises one or more spherical fillers and/or one or more platy fillers; (4) a modified epoxy resin; (5) an adhesion promoter; and (6) a substrate wetting agent.

25 Claims, 12 Drawing Sheets

(56) References Cited

U.S. PATENT DOCUMENTS

| | | | |
|---|---|---|---|
| 5,635,562 A | 6/1997 | Malcolm | |
| 5,756,555 A * | 5/1998 | Wesch | C08J 9/103 |
| | | | 521/73 |
| 6,110,985 A | 8/2000 | Wheeler | |
| 6,199,940 B1 | 3/2001 | Hopton et al. | |
| 6,277,903 B1 * | 8/2001 | Sophiea | C08G 59/226 |
| | | | 523/427 |
| 6,531,541 B1 | 3/2003 | Desai et al. | |
| 6,559,193 B2 | 5/2003 | Nonoyama et al. | |
| 7,288,290 B2 | 10/2007 | Chao et al. | |
| 7,658,967 B2 | 2/2010 | DiMario | |
| 8,746,784 B2 | 6/2014 | Hanakawa | |
| 9,920,192 B2 * | 3/2018 | Funderburg, Jr. | B05D 3/007 |
| 10,077,352 B2 * | 9/2018 | Funderburg | F16F 15/02 |
| 11,024,277 B2 | 6/2021 | Hussaini | |
| 2003/0083424 A1 * | 5/2003 | Duck | C09D 127/06 |
| | | | 524/523 |
| 2004/0087721 A1 | 5/2004 | Bruhn et al. | |
| 2004/0251386 A1 | 12/2004 | Mizukoshi et al. | |
| 2005/0042437 A1 | 2/2005 | Ramesh et al. | |
| 2006/0040096 A1 * | 2/2006 | Eadara | B32B 27/205 |
| | | | 428/212 |
| 2008/0176969 A1 * | 7/2008 | Tahri | G10K 11/16 |
| | | | 521/99 |
| 2009/0130316 A1 * | 5/2009 | Billast | C08L 27/06 |
| | | | 427/374.1 |
| 2010/0314813 A1 | 12/2010 | Wojtowicki et al. | |
| 2013/0137789 A1 * | 5/2013 | Olsen | C08K 5/12 |
| | | | 524/114 |
| 2015/0097136 A1 * | 4/2015 | Wulff | C08K 3/013 |
| | | | 252/62 |
| 2016/0027426 A1 | 1/2016 | Stopin | |
| 2016/0168413 A1 | 6/2016 | Chao et al. | |
| 2019/0287509 A1 * | 9/2019 | Kuczynski | G10K 11/162 |
| 2022/0251431 A1 | 8/2022 | Otsuki | |

* cited by examiner

NON-AQUEOUS SPRAYABLE AND CURABLE DAMPENING COMPOSITIONS FOR AUTOMOTIVE BODY AND CLOSURE PANELS AND ASSOCIATED METHODS FOR CURING AND USING THE SAME

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

1. Field of the Invention

The present invention relates in general to dampening (i.e., noise and vibration) compositions for automotive applications, and, more particularly, to non-aqueous, sprayable and heat curable dampening compositions for automobile body and closure panels. The compositions of the present invention easily cure at automotive e-coat bake conditions and show remarkable physical properties. The compositions of the present invention also exhibit excellent adhesion on oily steel metals (e.g., HDG, G70, E60, EZG, 60G, CRS, etcetera) and aluminum metals (e.g., 6022T43, 6061T6, 6111T4, 6016, 5052, 5754, 5182, etcetera) with high vibrational dampening properties. The present invention is further directed to methods for using and curing the dampening compositions disclosed herein.

2. Background Art

Sound dampeners typically have a composition that is based on one of the following materials, water, acrylic, epoxy, pre-cut pieces of fibrous asphaltic material, or aluminum constrained butyl rubber used to dampen road and engine noise that can be transmitted through the auto body substrates.

Sealants and sound dampeners typically are applied to a variety of areas in automobile bodies, such as the interior, roof panels, floor panels, firewalls, trunk compartment panels, hood, and in between the inner and outer panels of doors, under body, wheel arcs, etcetera.

Conventionally, sealants and sound dampeners are applied in the paint shop of an automobile body assembly line. The paint shop is the area of an automobile assembly line where paint is applied and cured.

The non-aqueous sprayable dampening coating compositions of the present invention have excellent adhesion to oily steel and aluminum metals with high vibration resistance, harsh noise reduction and absorption properties.

The dampening compositions of the present invention are particularly well-suited for noise, vibration, and harshness (NVH) performance, as well as corrosion protection of body and closure panels in the automotive industry.

The non-aqueous sprayable dampening coating compositions generally include a polymeric component in combination with a PVC polymer or copolymer, a plasticizer, a rubber-modified epoxy resin, a platy filler, and an adhesion promoter. The compositions are applied to the oily coated metal substrates, which are subsequently exposed to a heat treatment at a temperature in the range of about 130-190 degrees Centigrade for a period of about 10-60 minutes.

Sound Dampening of Polymers

Polymers possess viscoelasticity and provide dampening performance, although the viscoelastic property is not the only mechanism for providing such performance. The properties of viscoelastic material are influenced by many parameters including frequency, temperature of pre-load, strain rate, and more, when the dampening material is bonded to a vibrating surface. The dampening material itself is subjected to bending motion and alternating stress through the disruption of molecular bonds of the material's long chain molecules. The alternating stress cause cyclic deformation of the viscoelastic material.

The cyclic deformation applies forces to the vibrating sources to counter the motion and thus the vibration. This, along with molecular interaction within the material, forces the mechanical energy to be dissipated in the form of thermal energy.

Conventional dampening coatings use dampening materials in liquid form, which are sprayed or brushed onto the body surface. While the dampening sheet can appear smooth, the dampening coating can look uneven, with a significant amount of grain on its surface.

Thinner Gage Metal

Automotive manufacturers are being challenged to come up with radical solutions to achieve substantial (30-35%) vehicle weight reductions without compromising safety, durability, handling, aero-thermal or noise, vibration and harshness (NVH) performance. Developing light weight vehicle enablers have assumed foremost priority amongst vehicle engineering teams in order to address the stringent fuel economy performance (FEP) targets while facilitating lower $CO_2$ emissions, downsizing of engines, lower battery capacities, etcetera. Body sheet metal panels have become prime targets for weight reductions via gage reduction, high strength steel replacement, lighter material applications, lightening holes, etcetera. Many of these panel weight reduction solutions are in sharp conflict with NVH performance requirements. The main challenge for NVH engineers is to recover panel stiffness and mitigate the potentially increased air-borne as well as structure-borne noise transmissibility thru these lighter panels. This is achievable with a systematic approach to optimizing panel geometry and damping treatment upfront during the body structure development process while also incorporating innovative new light weight solutions for acoustic insulation. Further, a new methodology is introduced to assess panel sensitivities to mid-frequency structure borne noise which is then used to fine tune the panel features for stiffness as well as identification of target panel areas for efficient damping treatment.

Therefore, one object of the present invention is to provide non-aqueous, sprayable and heat curable dampening compositions for automobile body and closure panels that are easy to cure under automotive e-coat bake conditions and that show remarkable physical properties, as well as excellent adhesion to oily steel metals and/or aluminum metals.

These and other objects of the present invention will become apparent in light of the present specification, claims, and drawings.

SUMMARY OF THE INVENTION

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

The present invention is directed to non-aqueous, sprayable dampening coating compositions that exhibit very high composite loss factor such as, but not limited to, those adapted for applying sound dampening coating to bare metal substrates, and more particularly, the present invention is directed to compositions including PVC and a plasticizer combined with a rubber modified epoxy resin, an adhesion promoter additive and a platy filler.

The present invention is also directed to a non-aqueous sprayable and curable dampening composition for automotive body and closure panels which cures to form a cured product, comprising, consisting essentially of and/or consisting of: (a) a PVC homopolymer resin and/or a mixture of a PVC copolymer resin; (b) a phthalate plasticizer and a benzoate plasticizer; (c) a filler component, wherein the filler component comprises one or more spherical filler(s) and/or one or more platy filler(s); (d) a modified epoxy resin; (e) an adhesion promoter; and (f) a substrate wetting agent.

In a preferred embodiment of the present invention, the composition is solvent free and/or substantially solvent free.

In another preferred embodiment of the present invention, the PVC homopolymer/copolymer resin is present in a concentration ranging from approximately (i.e., +/−5%) 20 percent by weight to approximately (i.e., +/−5%) 40 percent by weight.

In yet another preferred embodiment of the present invention, the plasticizers are present in a concentration ranging from approximately (i.e., +/−5%) 20 percent by weight to approximately (i.e., +/−5%) 50 percent by weight.

In one preferred embodiment of the present invention, the filler component is present in a concentration ranging from approximately (i.e., +/−5%) 15 percent by weight to approximately (i.e., +/−5%) 50 percent by weight.

In a preferred implementation of the present invention, the modified epoxy resin is present in a concentration ranging from approximately (i.e., +/−1%) 3 percent by weight to approximately (i.e., +/−1%) 15 percent by weight.

In another preferred implementation of the present invention, the adhesion promoter is present in a concentration ranging from approximately (i.e., +/−0.5%) 1 percent by weight to approximately (i.e., +/−0.5%) 5 percent by weight.

In yet another preferred embodiment of the present invention, the substrate wetting agent is present in a concentration ranging from approximately 0.1 (i.e., +/−0.1%) percent by weight to approximately (i.e., +/−0.1%) 3.0 percent by weight.

In one preferred implementation of the present invention, the PVC homopolymer/copolymer resin comprises an average molecular weight ranging from approximately (i.e., +/−5%) 60,000 Daltons to approximately (i.e., +/−5%) 200,000 Daltons.

In a preferred embodiment of the present invention, the phthalate plasticizer comprises a diisononyl phthalate and the benzoate plasticizer comprises a dibenzoate plasticizer.

In another preferred embodiment of the present invention, the weight ratio of the platy filler to the spherical filler is approximately (i.e., +/−2%) 20:1.

In yet another preferred embodiment of the present invention, the modified epoxy resin comprises a Bisphenol A and/or a Bisphenol F based epoxy resin.

In one preferred embodiment of the present invention, the adhesion promoter comprises an epoxy-based silane.

In a preferred aspect of the present invention, the substrate wetting agent comprises a silicone-modified polyacrylate.

In a preferred embodiment of the present invention, the composition further comprises a fumed silica thixotropic filler, a curing agent (e.g., a dicyanamide), a curing accelerator (e.g., a substituted phenyl urea), a moisture scavenger (e.g., calcium oxide, zinc oxide, silica gel, activated charcoal, calcium sulfate, calcium chloride, zeolites, desiccants, etcetera) and/or other adjunct agents.

The present invention is also directed to a method for using a curable dampening composition, comprising the steps of, consisting essentially of the steps of, and/or consisting of the steps of: (a) providing a curable dampening composition comprising, consisting essentially of, and/or consisting of: (1) a PVC homopolymer resin and/or a mixture of a PVC copolymer resin; (2) a phthalate plasticizer and a benzoate plasticizer; (3) a filler component, wherein the filler component comprises one or more spherical filler(s) and one or more platy filler(s); (4) a modified epoxy resin; (5) an adhesion promoter; and (6) a substrate wetting agent; (b) spraying a coating of the composition onto a substrate; and (c) curing the coating of the composition on the substrate such that the cured composition comprises an interpenetrating network of a cured epoxy modified rubber and cured PVC resin.

In a preferred embodiment of the present invention, the step of curing includes the step of heating the substrate and composition to a temperature ranging from approximately (i.e., +/−5° C.) 130 degrees Centigrade to approximately (i.e., +/−5° C.) 190 degrees Centigrade for approximately (i.e., +/−2 minutes) 10 minutes to approximately (i.e., +/−2 minutes) 60 minutes.

In another preferred embodiment of the present invention, the step of spraying includes spraying the coating of the composition onto an oily substrate (e.g., metal, metal alloy, etcetera).

In yet another preferred embodiment of the present invention, the cured coating composition comprises a thickness ranging from approximately (i.e., +/−0.2 mm) 1.0 millimeters (mm) to approximately (i.e., +/−0.2 mm) 5.0 mm.

In one preferred embodiment of the present invention, the curable composition comprises a viscosity of approximately (i.e., +/−2%) 600 pascal-second or less and can be sprayed to form a cured coating composition which has a greater than 0.200 Obrest dissipation composite loss factor as measured at 200 Hz at 25° C. with 2 mm thickness in accordance with SAE J1637.

In a preferred implementation of the present invention, the cured coating composition comprises a density of equal to or less than approximately (i.e., +/−0.2 g/cc) 1.4 g/cc.

In another preferred implementation of the present invention, the cured coating composition comprises an elongation equal to or less than approximately (i.e., +/−2%) 100%.

In yet another preferred implementation of the present invention, the cured coating composition comprises a tensile strength equal to or less than approximately (i.e., +/−1 Mpa) 7 Mpa.

BRIEF DESCRIPTION OF THE DRAWINGS

Certain embodiments of the present invention are illustrated by the accompanying figures. It will be understood that the figures are not necessarily to scale and that details not necessary for an understanding of the invention or that render other details difficult to perceive may be omitted.

It will be further understood that the invention is not necessarily limited to the particular embodiments illustrated herein.

Figure 1:
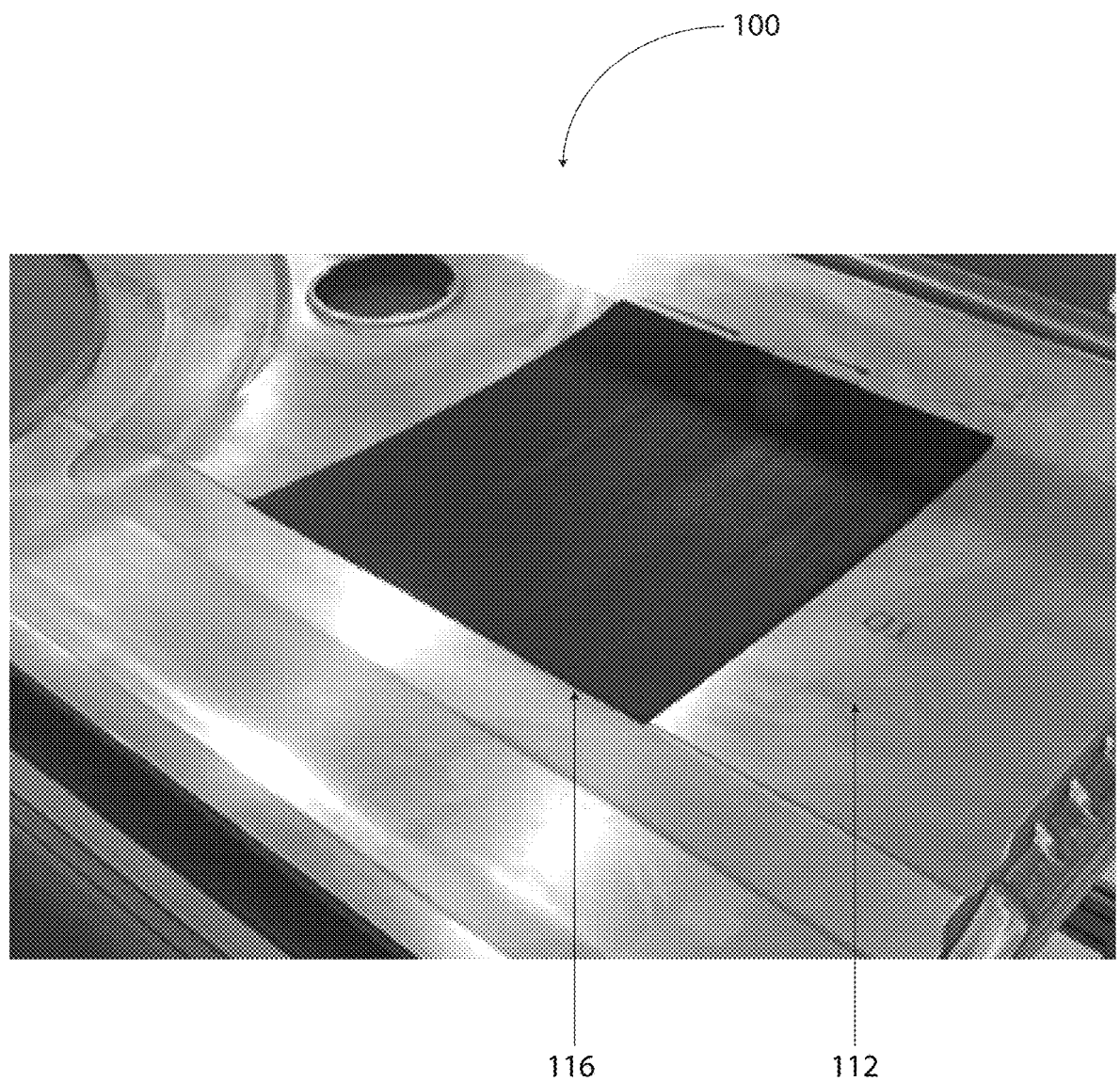
Figure 2:
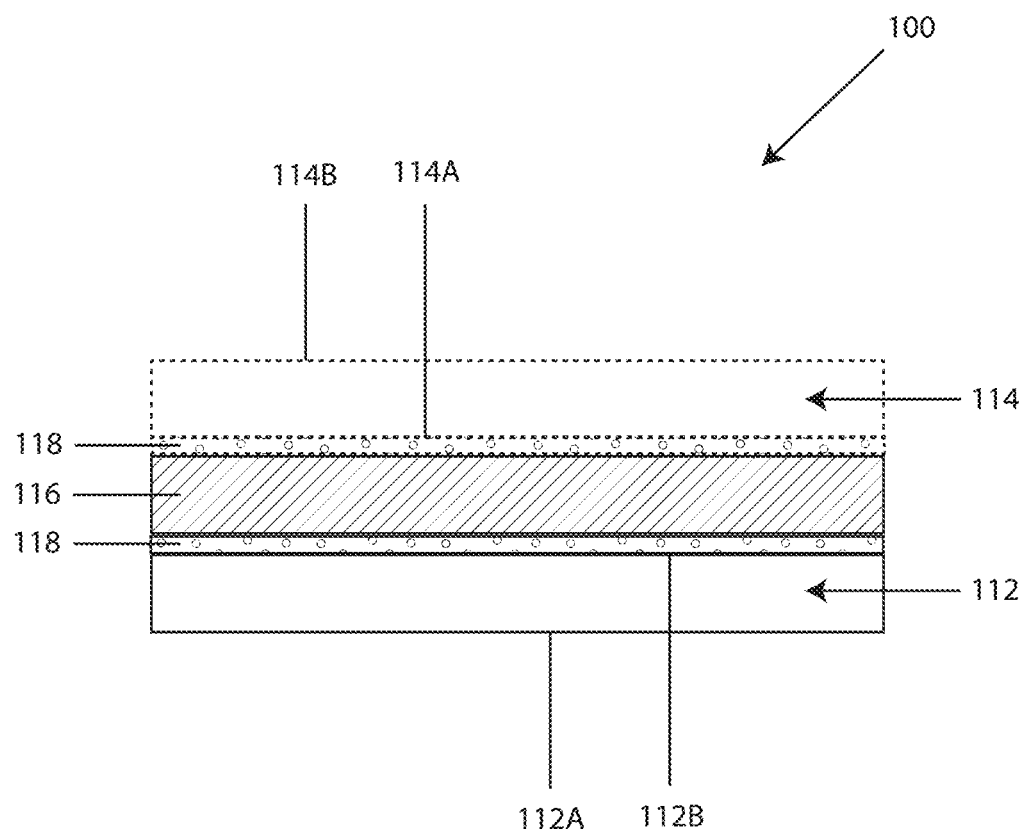
Figure 3:
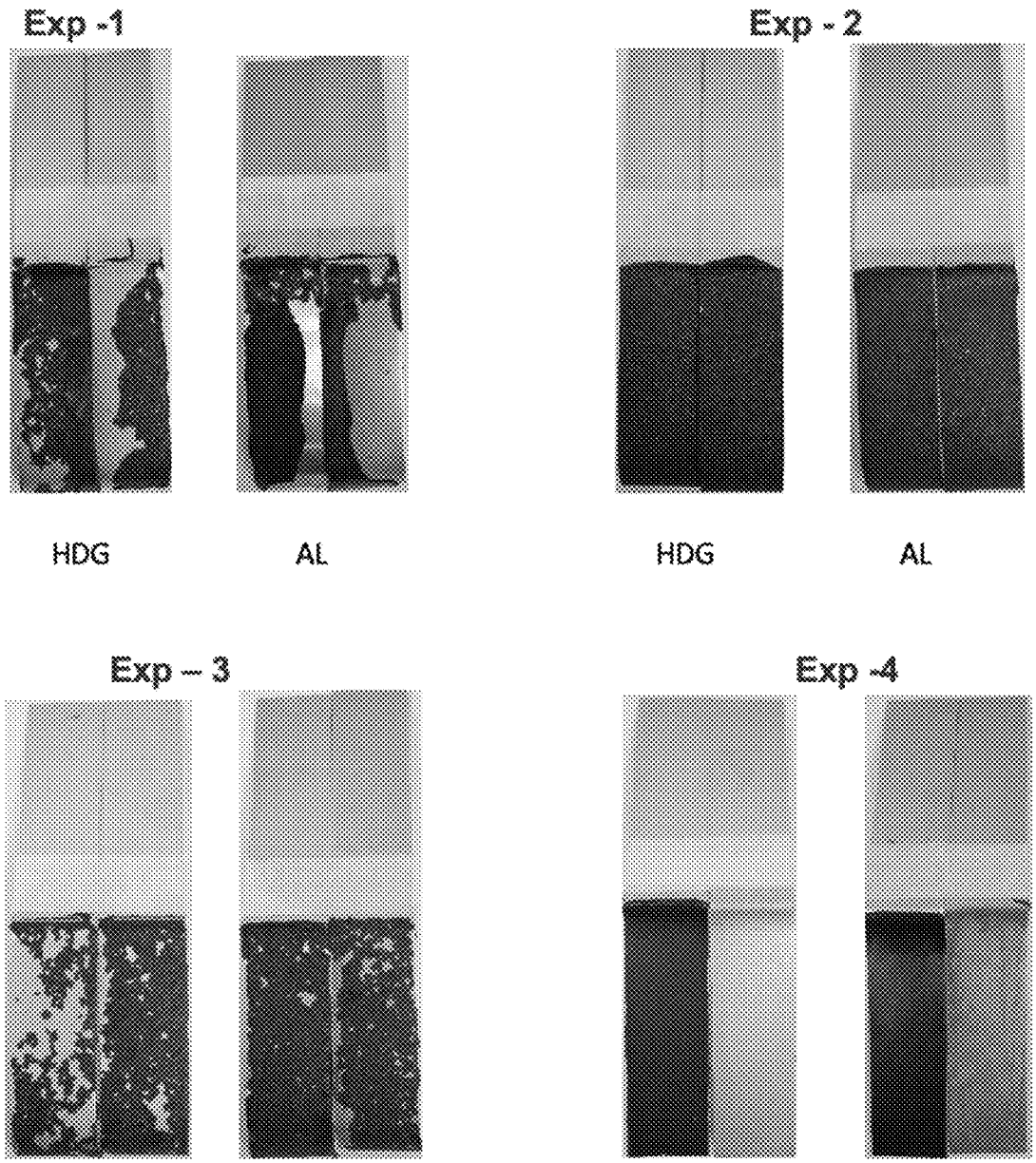
Figure 10:
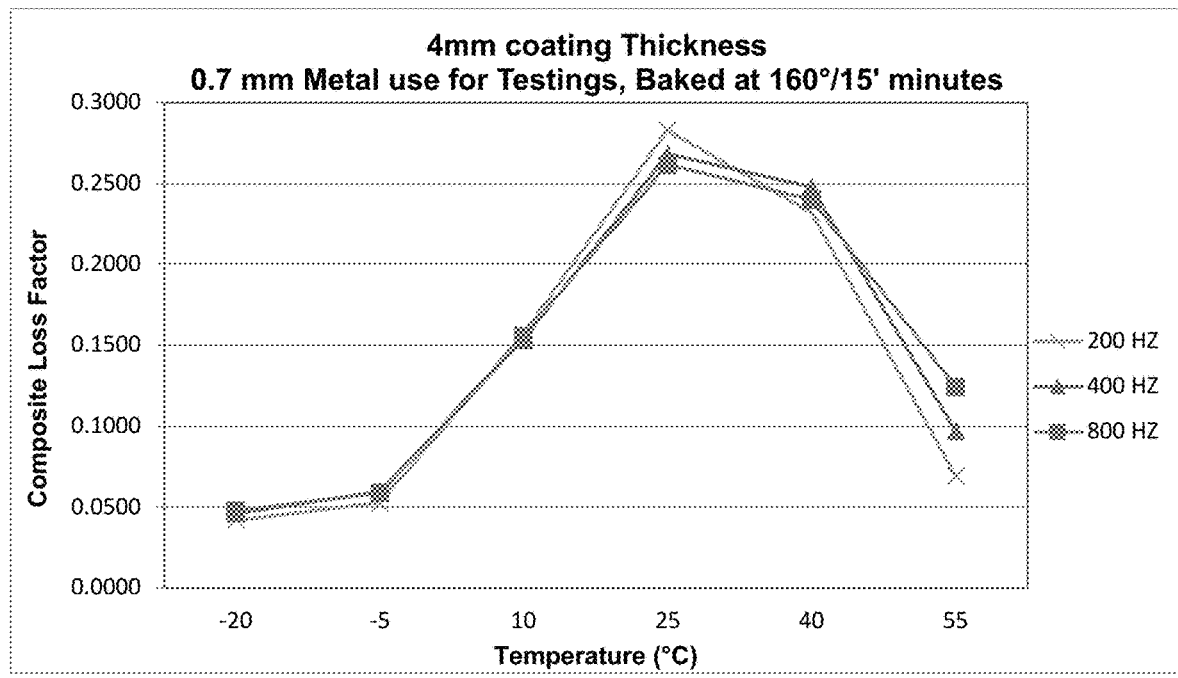
Figure 11:
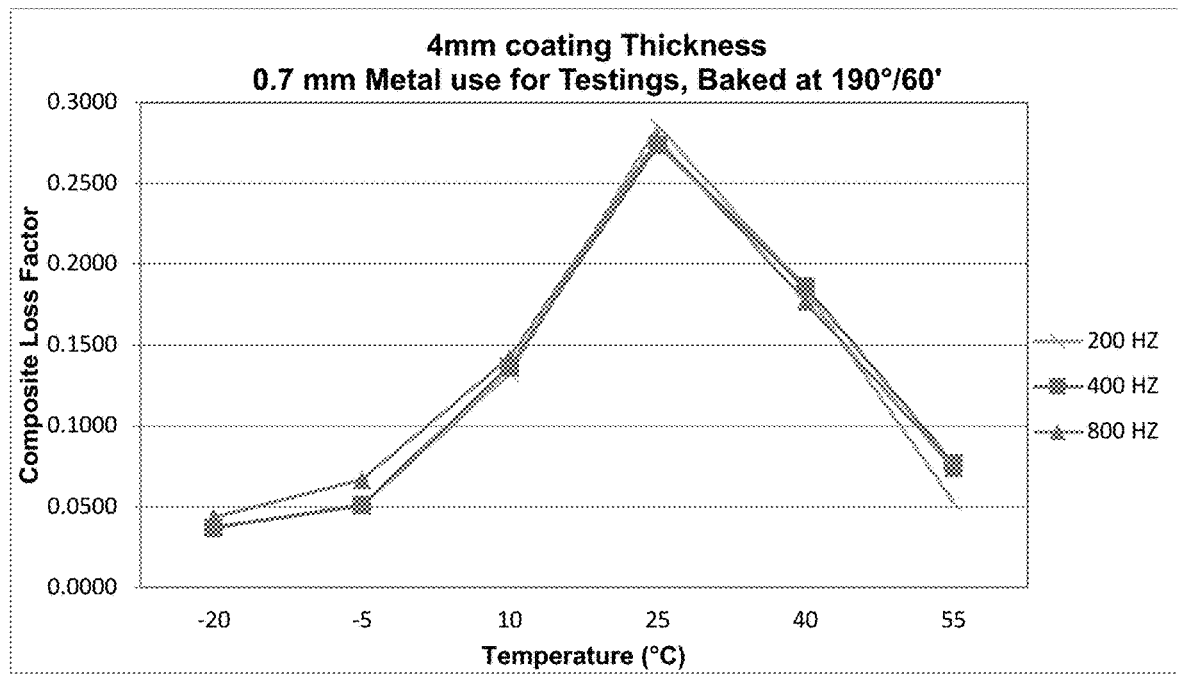
Figure 12:
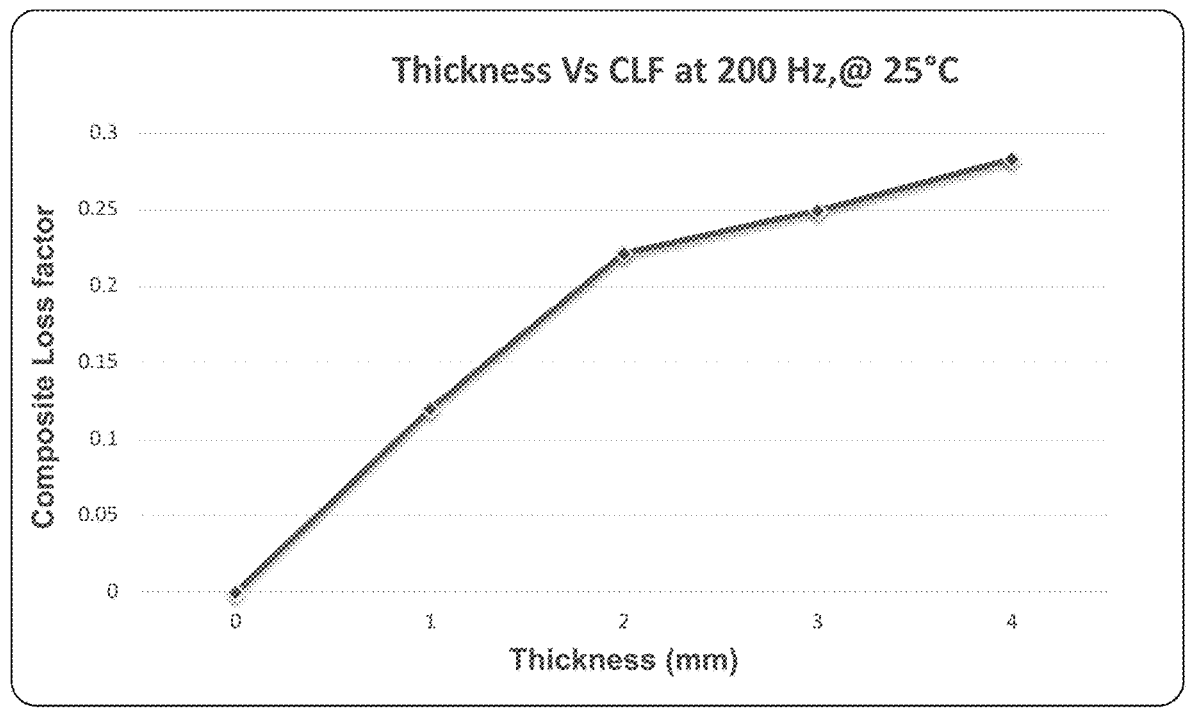

The invention will now be described with reference to the drawings wherein:

FIG. 1 of the drawings is a perspective view of a cured dampening composition adhered to a vehicular substrate/panel;

FIG. 2 of the drawings is a cross-sectional representation of the cured dampening composition adhered to the vehicular substrate/panel of FIG. 1;

FIG. 3 of the drawings are T peel adhesion test result photographs of the present invention;

FIGS. 4-11 of the drawings are two-dimensional graph showing composite loss factor as a function of temperature; and FIG. 12 of the drawings is a two-dimensional graph showing composite loss factor as a function of thickness.

DETAILED DESCRIPTION OF THE INVENTION

While this invention is susceptible of embodiment in many different forms and applications, there are shown in the drawings and described herein in detail several specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings by like reference characters. In addition, it will be understood that the drawings are merely schematic representations of one or more embodiments of the invention, and some of the components may have been distorted from their actual scale for purposes of pictorial clarity.

As will be discussed and shown experimentally hereinbelow, the present invention is directed to non-aqueous, sprayable and heat curable dampening compositions for automobile body and closure panels. The compositions of the present invention easily cure at automotive e-coat bake conditions and show remarkable physical properties. Once cured, the compositions of the present invention also exhibit excellent adhesion on oily steel and aluminum metals with high vibrational dampening properties.

Referring now to the drawings, and to FIGS. 1-2 in particular, component assembly 100 is shown, which generally comprises first substrate 112 having first surface 112A and second surface 112B, optional second substrate 114 having first surface 114A and second surface 114B, and cured dampening composition or product 116. It will be understood that component assembly 100 may comprise, for illustrative purposes only, a variety of areas in automobile bodies, such as interior panels, roof panels, floor panels, firewalls, trunk compartment panels, hood, and in between the inner and outer panels of doors, under body, wheel arcs, etcetera. It will be further understood that cured dampening composition 116 may be applied to a single substrate/panel (112) and/or sandwiched between two substrates/panels (112, 114). For purposes of the present disclosure, surface 112B of substrate 112 (and if present surface 114A of substrate 114) is/are typically coated with oil 118, such as mineral oil, crude oil, refined oil, and/or other petroleum and non-petroleum products used for lubrication and/or corrosion resistance during product fabrication, warehousing, storage, production, etcetera. Oil 118 may comprise a continuous, intermittent, and/or spotted layer on the substrate.

First substrate 112 may be fabricated from any one of a number of materials, such as, for example, steel, steel electrogalvanized with zinc, steel hot dipped galvanized with zinc, aluminum, metal alloys, d-block metals, and combinations thereof. First substrate 112 may also be fabricated from, for example, borosilicate glass, soda lime glass, float glass, natural and synthetic polymeric resins, plastics, and/or composites including Topas®, which is commercially available from Ticona of Summit, New Jersey. First substrate 112 is preferably fabricated from a sheet having a thickness ranging from approximately 0.25 mm to approximately 5.00 mm, and more preferably ranging from approximately 0.75 mm to approximately 2.50 mm. It will be understood, that unless specified otherwise, the term approximately, as used herein, will be defined as the value, number, and/or integer +/−10 percent. Of course, the thickness of the substrate will depend largely upon the particular application of the assembly. While particular substrate materials have been disclosed, for illustrative purposes only, it will be understood that numerous other substrate materials are likewise contemplated for use-so long as the materials exhibit appropriate physical properties, such as strength, to be able to operate effectively in conditions of intended use. Indeed, substrate assemblies in accordance with the present invention can be, during normal operation, exposed to extreme temperature variation, as well as substantial UV radiation, emanating primarily from the sun.

Optional second substrate 114 may be fabricated from similar and/or dissimilar materials as that of first substrate 112. As such, second substrate 114 may comprise polymers, metals, glass, and ceramics—to name a few. Second substrate 114 is preferably fabricated from a sheet having a thickness ranging from approximately 0.25 mm to approximately 5.00 mm, and more preferably ranging from approximately 0.75 mm to approximately 2.50 mm.

As will be discussed herein below, cured dampening composition 116 is preferably fabricated from a non-aqueous sprayable and curable dampening composition comprising: (1) a PVC homopolymer resin and/or a mixture of a PVC copolymer resin; (2) a phthalate plasticizer and a benzoate plasticizer; (3) a filler component, wherein the filler component comprises one or more spherical filler(s) and one or more platy filler(s); (4) a modified epoxy resin; (5) an adhesion promoter; (6) a substrate wetting agent; and (7) any adjunct agents.

Components of the curable dampening composition of the present invention are provided below.

Polyvinyl Chloride (PVC) Resin

In a preferred embodiment of the present invention, the sound dampening coating or composition comprises a PVC homopolymer or copolymer with dispersion resin or blended resins. The sound dampening coatings containing PVC have high molecular weight homopolymer and fast fusion copolymer or both combined.

By conventional definition a poly (vinyl chloride) (PVC) plastisol is comprised of a mixture of a PVC homopolymer or copolymer with a plasticizer. Both PVC homopolymers and copolymers, having average molecular weights ranging from approximately 60,000 Daltons to approximately 200,000 Daltons, are suitable for use in the present invention.

Suitable PVC copolymers include vinyl chloride-vinyl acetate copolymers. Other comonomers with PVC include: vinylidene chloride, acrylonitrile, diethyl maleate, maleic anhydride, ethylene, propylene and other ester monomers.

Polymers other than PVC may also be incorporated into the formulations to improve other performance characteristics.

Preferably, a low fusion vinyl-chloride/vinyl-acetate copolymer dispersion is utilized. A low fusion temperature phthalate plasticizer is also preferably used at a level of approximately 60-100 phr.

Resins of the present invention should be chosen that produce a high yield along with a low viscosity under high shear. Rapid gelation and fusion are preferred to improve processing speeds.

Dispersion resins are fine particles of PVC. These materials are produced from emulsion polymerization. Resins are classified into three areas: polymer type (homopolymer or copolymer), molecular weight, and particle size and shape. A copolymer is PVC resin that has been blended with a non-vinyl chloride monomer. Most common copolymers contain between 3% and 7% vinyl acetate. Copolymers are used in applications requiring low-fusion temperature or improved adhesion. High-molecular weight resins are used in applications requiring high physical properties. They require higher fusion temperatures and times to obtain these properties. Size and shape of the resin particles contribute to the viscosity characteristics of a plastisol. The particle size of a dispersion resin is approximately 0.5 to 2.0 microns. Small particle sizes and irregular shapes increase the resin surface area, which increases plasticizer absorption and plastisol viscosity. Typically, the compositions of the present invention may contain from about 0.5 to about 50 weight percent of PVC resin. The coating may contain up to 40% by weight, preferably 10 to 35% by weight of PVC resins.

Plasticizer

Plasticizers are often used in thermoplastic polymers, thermosetting polymers, and elastomeric polymers and numerous applications, including but not limited to, plastisols, dry blends, adhesives, sealants, caulks, architectural coatings, industrial coatings, OEM coatings, inks, overprint varnishes, polishes, and the like. In particular, when used in thermoplastic polymers, plasticizers are utilized to improve flexibility of the polymer. They also improve fusion behavior by lowering the glass transition temperature Tg of the polymer. Without wishing to be bound by any one particular theory, plasticizers are believed to interact with the polymer chains in such thermoplastic polymers to speed up viscoelastic response and/or increase chain mobility.

Each plasticizer has its own strength, but all commercially viable plasticizers include a set of performance characteristics. In this case, the plasticizer needs to be compatible with PVC resin(s) to provide flexibility. It is important that the plasticizer aid in the fusion process, reducing the glass transition temperature (Tg) to a more manageable and safer temperature, and facilitating the dissolution and distribution of molecules such that the final part is fully homogeneously dispersed.

One thermoplastic polymer which has been the subject of much study and commercial utilization is poly (vinyl chloride) (PVC). In such polymers, one often uses a combination of plasticizers and additives, targeting performance characteristics per a desired end use, while minimizing cost. In such plasticized PVC systems there is typically a "primary plasticizer" and in some cases a "secondary plasticizer."

The term "primary plasticizer" generally refers to molecules which are highly compatible with PVC up to at least about 150 per hundred parts resin (phr). Primary plasticizers tend to increase flexibility of the underlying polymer by directly interacting with the polymer. Primary plasticizers can often be described as "highly solvating" (fast fusing) plasticizers. Highly solvating plasticizers tend to lower fusion temperatures and times, but can also have a negative impact by raising viscosity of a plastisol.

A wide variety of plasticizers are available to formulate the plastisol. Suitable plasticizers for use in the present invention include: phthalates, adipates, benzoates, azelates, carbonates, trimellitates, phosphates, citrates, stearates, sebacates, glutarates, glycerol esters, glycol esters, butyrates, oleates, alkyds, polymeric esters, epoxidized oils, epoxy tallates, amide-esters, sulfonamides or terpenes.

Secondary plasticizers are typically utilized in conjunction with primary plasticizers to either reduce overall plasticizer cost or to obtain improvement in electrical or low temperature properties.

Preferred primary plasticizers of the present invention include:

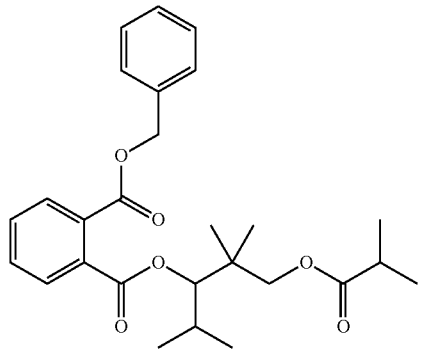

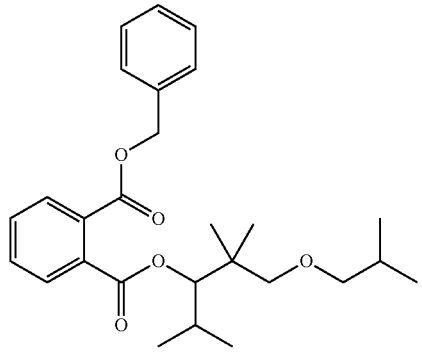

benzyl 3-isobutyloxy-1-isopropyl-2,2-dimethylpropyl phthalate

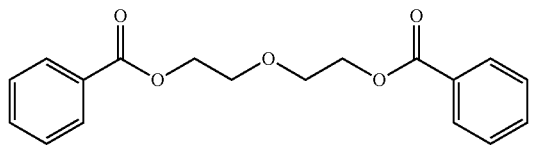

oxybis(ethane-2,1-diyl) dibenzoate

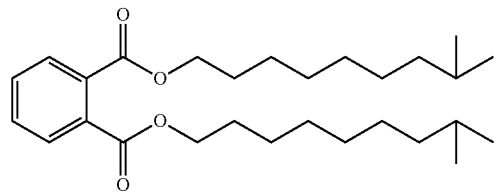

diisodectyl phthalate (DIDP)

-continued

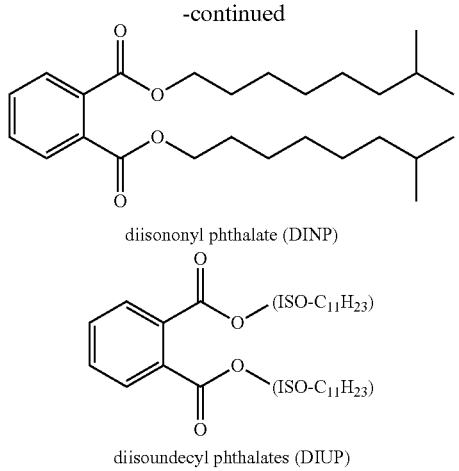

diisononyl phthalate (DINP)

diisoundecyl phthalates (DIUP)

Preferred benzoate plasticizers are dibenzoate esters, most preferably (propyleneglycol)1-4 dibenzoates, (ethyleneglycol)1-4 dibenzoates and dibenzoate esters of 2,2,4-trimethyl-1,3-pentane diol. The dibenzoate plasticizers can, in preferred embodiments, be used in mixture with a second (non-benzoate)

Plasticizers other than benzyl phthalates may also be used. The proportions of the second plasticizers are expressed in relation to the total level (benzoate+second plasticizer) of plasticizer (100%).

Preferred benzyl phthalates include alkyl benzyl phthalates wherein the alkyl chain, is linear, branched and/or substituted, and contains from 2 to 16 carbon atoms. Examples of other suitable plasticizers include dialkyl phthalates such as di(2-ethylhexyl) phthalate, di-isononyl phthalate, di-isodecyl phthalate, diundecyl phthalate, dibutyl phthalate, dioctyl phthalate, $C_3$-$C_{24}$ esters of adipic, azelaic, sebacic, trimellitic, citric and phosphoric acid, alkyl esters, of fatty acids, alkyl sulfonic acid esters of phenols and epoxidized triglycerides. Other preferred plasticizers, other than benzyl phthalates, include those represented by (ethylene glycol) 2-4-di($C_2$-$C_{22}$ alcanoate), more preferably 2-4-di($C_4$-$C_{16}$ alcanoate). The weight ratio of primary plasticizer to secondary plasticizer preferably ranges from 1:1 to 100:1 and more preferably 2:1, 3:1, 4:1, 5:1, 10:1, and/or 20:1. Typically, the compositions of the present invention may contain from about 0.5 to about 50 weight percent of plasticizer. The coating may contain up to 40 weight percent, preferably 10 to 25 weight percent of plasticizer.

Fillers

Fillers suitable for use in accordance with the present invention include spherical fillers and/or platy fillers that preferably have a high aspect ratio, typically about 20:1). Fillers can also include talc, mica, carbonates, and micronized rubber powder. Preferably, the filler component is present in a concentration ranging from approximately 15 percent by weight to approximately 50 percent by weight, and more preferably from approximately 15 percent by weight to approximately 30 percent by weight. In one embodiment, the filler may comprise calcium magnesium carbonate, barium sulfate, a mineral fiber such as calcium meta silicate and mixtures thereof. In a further embodiment, the filler may optionally include an organically modified clay. Not intending to be bound by any one theory, it is believed that calcium magnesium carbonate provides sound dampening properties and may be present in the coating composition of the present invention in an amount from 5 to 40 percent by weight based on total weight of the coating composition.

CTBN Rubber Modified Epoxy Resin

A rubber-modified epoxy resin is an epoxy-terminated adduct of an epoxy resin and at least one liquid rubber that has epoxide-reactive groups, such as amino or preferably carboxyl groups. The rubber in this case is preferably a homopolymer or copolymer of a conjugated diene, especially a diene/nitrile copolymer. The conjugated diene rubber is preferably butadiene or isoprene, with butadiene being especially preferred. The preferred nitrile monomer is acrylonitrile. Preferred copolymers are butadiene-acrylonitrile copolymers. The rubbers preferably contain, in the aggregate, no more than 30 weight percent polymerized unsaturated nitrile monomer, and preferably no more than about 26 weight percent polymerized unsaturated nitrile monomer.

Suitable rubber-modified epoxy resin starting materials are commercially available from KUKDO under the trade name KR 170 with E.E.W—200-235, viscosity 30,000 to 600,000 cps at 25° C., Struktol under the trade name of Polydis 3605 with E.E.W—300-330, Viscosity 50,000 cps, Huntsman Advanced materials under the trade name of Hypox RA 840 with E.E.W—332-360, viscosity 150,000-230,000 cps. The CTBN rubber modified epoxy resin should have glass transition temperature (TG) of no greater than 25° C. Preferably, at least a portion of the CTBN modified epoxy has a TG of −40° C., or lower, more preferably −50° C. or lower or more preferably −70° C. or lower.

Provided below is a non-limiting example of a structural formula for the modified epoxy rubber and/or precursors thereto:

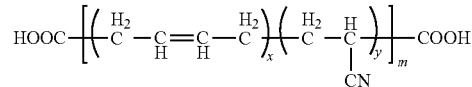

CTBN
wherein x is an integer ranging from 1 to 20
wherein y is an integer ranging from 1 to 50
wherein m is an integer ranging from 1,000 to 100,000

Dimer Acid Modified Epoxy

Dimer acids provide epoxy resins with enhanced flexibility, but the reduced glass transition temperature is not always favorable. Building of dimerized fatty acid into carboxylic acid-terminated polyesters makes it available for incorporation in epoxy resins as a larger-molecular-weight species. Due to the polar character of the dimer-based polyesters, it can be expected that they will form a separate phase in the more polar epoxy matrix. As such, they can be introduced as a second-phase toughness modifier. By reaction-induced phase separation, the modifier forms soft domains within the hard epoxy matrix.

Suitable dimer acid modified epoxy resin starting materials are commercially available from Huntsman Advanced materials under the trade name of Hypox DA 323 with E.E.W—600-725, viscosity 40,000-60,000 cps, and KUKDO under the trade name of YD 171 E.E.W—390-470, viscosity 4,000-9,000 cps.

Other Modified Epoxy Resins

Suitable nitrile rubber modified epoxy resins include those from KUKDO under the trade name of KR 208 E.E.W—270-330, viscosity 8,000-12,000 cps.

Suitable urethane modified epoxy resins include those from Huntsman Advanced materials under the trade name of HyPox UA11 E.E.W—215, viscosity 35,000 cps.

Suitable epoxidized hydroxyl terminated polybutadiene rubber include those from Total Petrochemical under the trade name of Poly BD 605E with E.E.W—300, viscosity—25,000 cps.

Additional suitable options include the core-shell graft copolymers, such as ABS and MBS core shell rubber modified epoxy include, but are not limited to, "MBS (meth acrylate-butadiene-styrene) polymers, which are made by polymerizing methyl methacrylate in the presence of polybutadiene or a polybutadiene copolymer rubber. The MBS graft copolymer resin generally has a styrene butadiene rubber core and a shell of acrylic polymer or copolymer. Examples of other useful core-shell graft copolymer resins include, ABS (acrylonitrile-butadiene-styrene), MABS (methacrylate-acrylonitrile-butadiene-styrene), ASA (acrylate-styrene-acrylonitrile), all acrylics, SA EPDM (styrene acrylonitrile grafted onto elastomeric backbones of ethylene propylene diene monomer), MAS (methacrylic-acrylic rubber styrene), and the like and mixtures thereof.

Preferably, the modified epoxy resin is present in a concentration ranging from approximately 3 percent by weight to approximately 15 percent by weight.

Neat Epoxy Resin

Preferred epoxy resins include commercially available diglycidyl ethers, including diglycidyl ethers of bisphenol-A resin, such as those sold by Dow chemical under the trade names D.E.R 330, D.E.R 331, D.E.R 332, D.E.R 338, D.E.R 661 and D.E.R 662 resins, and Kukdo Chemical under the trade name of YD 128, EPON resins such as Epon 826 and 828.

Preferred epoxy resins include commercially available diglycidyl ethers, including diglycidyl ethers of Bisphenol-F resin, such as those sold by Dow Chemical under the trade name D.E.R 354, and Kukdo Chemical under the trade name of YDF 170, and EPON resins such as Epon 862. Preferably, these have average epoxy equivalent weights from about 170 to 600 or more, preferably from 225 to 400.

and fluoro-modified surfactants. Additional examples include commercially available BYK 333, 378, 390, 392, and 3550. The substrate wetting agent is preferably present in a concentration ranging from approximately 0.1 percent by weight to approximately 3.0 percent by weight, and more preferably from approximately 0.1 percent by weight to approximately 1.0 percent by weight.

Curing Agents and Accelerators

In accordance with the present invention, the dampening compositions preferably include a curing agent such as cyanoguanidine (micronized grade of dicyandiamide). An epoxy hardener commercially available as Amicure CG-1200 from Evonik Corporation USA.

The dampening compositions also preferably include a curing accelerator, such as 1-phenyl-3,3 dimethyl urea, commercially available as Amicure-UR from Evonik Corporation USA.

The curing agents and/or accelerators are each preferably present in a concentration ranging from approximately 0.1 percent by weight to approximately 3.0 percent by weight, and more preferably from approximately 0.5 percent by weight to approximately 1.0 percent by weight.

Moisture Scavengers

In accordance with the present invention, the dampening compositions may also include one or more moisture scavengers, such as, but not limited to, calcium oxide and/or zinc oxide. The moisture scavengers are each preferably present in a concentration ranging from approximately 0.1 percent by weight to approximately 5.0 percent by weight, and more preferably from approximately 0.5 percent by weight to approximately 2.5 percent by weight.

Other Items (Adjunct Agents)

The inventive compositions may, in addition to fillers mentioned hereinabove, may also contain other fillers, such as the various ground or precipitated calcium carbonate, quartz powder, alumina, non-platy clays, dolomite, carbon fibers, glass fibers, polymeric fibers, titanium dioxide, fused silica, carbon black, zinc oxide, calcium oxide, calcium magnesium carbonates, barite and, especially, silicate-like fillers of the aluminum magnesium calcium silicate type, for

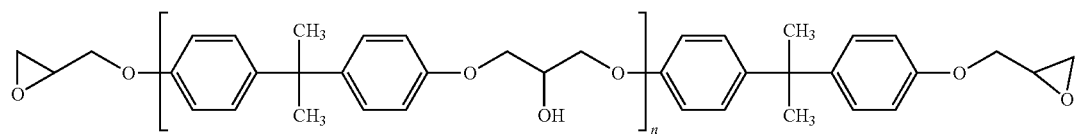

DGEBA (Epoxy Resin)

wherein n in an integer ranging from 500 to 50,000

Adhesion Promoters

To improve adhesion of the cured dampening coating to a substrate surface, especially a metallic substrate surface contaminated with heavy oily substances as is commonly encountered in vehicle assembly operations, one or more adhesion promoters are preferably chosen from epoxy resins, blocked isocyanates, organofunctional silanes, and mixtures of urotropine and resorcinol, as well as combinations thereof.

Substrate Wetting Agent

The dampening compositions of the present invention preferably include one or more substrate wetting agents for improving adhesion to oily substrates. Suitable examples include surfactants based on polysiloxanes, polyacrylates example wollastonite. Typically, the compositions of the present invention may contain from about 0.5 to about 30 weight percent of fillers. The coating may contain up to 10% by weight, preferably 1 to 6% by weight of fumed silica as rheological additive.

Tests/Experiments

Sound Dampening

The benefits of the non-aqueous sprayable dampening coating compositions and associated methods can be measured with the Oberst bar as, for instance, described in the method SAE J1637. This method is used to determine the dampening properties of coated metal bars. The coating consists of a sealant formulation. For comparative testing purposes, sheets to which the sealant have been applied, having a thickness of 2 mm, are heated to 170° C., maintained at that temperature for 15 minutes and cooled to ambient temperature. The loss factor data and nomograms are generated from a vibrating beam tester (VBT) available from Dampening Technologies Inc., U.S., in accordance with SAE J1637. Composite loss factors are obtained from the measurement in a sandwich construction, using beams with known material properties. The material loss factor is calculated from this composite loss factor, considering the mechanical properties of the sandwich materials used, wherein the coated substrate has a sound dampening value greater than 0.200 Obrest dissipation composite loss factor as measured at 200 Hz at 25° C. in accordance with SAE J1637.

Automotive Lubricants

The non-aqueous sprayable dampening coating compositions of the present invention can be effectively applied to a variety of substrates, including metal, coated metal, aluminum. In one preferred embodiment, the coating composition is used to coat automotive parts. Such parts can be steel, coated steel, galvanized steel, and/or aluminum substrates.

The compositions of the present invention can be applied to one or both substrates 112, 114 (See FIG. 2) even when an oil and/or oily material is on the surfaces of the substrates. By "oily material", it is meant an electrostatically neutral, hydrophobic material that has a melting temperature of 40° C. or lower and a viscosity of at least 5 centistokes (5 mm$^2$/s) at 40° C. As measured by ASTM D445, the viscosity may be, for example, at least 8 centistokes, at least 20 centistokes or at least 50 centistokes to as much as 500 centistokes at that temperature. By hydrophobic, it is meant the material is soluble in water to the extent of no more than 2 parts by weight per 100 parts by weight water at 23° C. (i.e., generally water insoluble). The oily material may include, for example, a petroleum product, a plant or animal oil or fat, and/or a synthetic oil, such as various types of synthetic ester lubricants. Examples of oily materials include for example, typical stamping lubricants that contain mineral oil 60-70%, sulfonic acids over based calcium sulfonate 5-10% and sodium sulfonate 1-5% in combination or individually.

Stamping lubricants are commercially available from Quaker Houghton, Conshohocken, PA., USA, Chemtool Inc., Rockland, IL., USA, Fuchs Lubricants Co, Harvey, IL., USA, and Henkel Bonderite Lubricants., USA among many others. A specific example is Ferrocote MAL HCL-1 from Quaker Houghton Conshohocken, PA USA. The oily material may contain various types of petroleum contaminants. The amount of oil on the surface of the substrate to which the adhesive is applied may be, for example 0.1 to 10 g/m$^2$, 0.25 to 5 g/m$^2$, and/or 0.5 to 3.0 g/m$^2$.

Examples of automotive lubricants include, Quaker FERROCOTE EGL-1, Quaker FERROCOTE 61A-US, Quaker FERROCOTE DryCote 290, Quaker FERROCOTE 6130, Henkel Multan PL MP-404, Fuchs Anticorit RP 4107S, Fuchs Anticorit PL 3802-39S, and Fuchs Anticorit PL 39-LV12.

| SAE J1637 | | | |
|---|---|---|---|
| | Length | Width | Thickness |
| Dimensions for Obrest | Total length: 245 mm Coating length: 220 mm | 12.7 mm | Metal- 1 mm Coating- 2 mm, 3 mm, |
| Bar SAE J1637 | | | 4 mm |

TABLE 1

Typical Conventional Sound dampening composition (LASD)

| Raw materials | Weight % |
|---|---|
| Styrene Acrylic copolymer emulsion contains 40% water | 50-60 |
| Water | 1.5-3.0 |
| Anti-foaming agent | 0-0.5 |
| Polyacid dispersant | 1-2 |
| Carbon Black | 0-2 |
| Ground Calcium Carbonate | 10-25 |
| Barium Sulfate | 1-10 |
| Mica 325 | 1-7 |
| Rheology Modifier | 0-1 |
| Total | 100 |

Conventional Sound Dampening Disadvantages

Conventional sound dampening coatings normally contain water-based solvents ranging from 30-40%. This water will evaporate during the baking process and the coating remain on the panel will be 60-70% solid content. Conventional sound dampening coating density of uncured material is 1.6-1.7 g/cc. Dry density is 1-8-1.9 g/cc. This adversely impacts the vehicle weight. Moreover, conventional sound dampening coating application tip needs to be washed frequently with water due to the air-drying properties of water-based polymer emulsion. Lastly, conventional sound dampening coatings are only suitable for e-coat metal substrates at paint shop during sealer application.

TABLE 2A

Dampening Compositions of the Present Invention

| Raw material | Exp 1 (%) | Exp 2 (%) | Exp 3 (%) | Exp 4 (%) |
|---|---|---|---|---|
| PVC Homo polymer - 1 | 25 | 25 | 25 | 25 |
| PVC resin copolymer - 2 | 7 | 7 | 7 | 7 |
| Curing agent - 3 | 1.2 | 1.2 | 1.2 | 1.2 |
| Accelerator - 4 | 0.3 | 0.3 | 0.3 | 0.3 |
| Plasticizer 1 - 5 | 20 | 20 | 20 | 20 |
| Plasticizer 2 - 6 | 5 | 5 | 5 | 5 |
| Adhesion Promoter - 7 | 0.8 | 0.8 | 0.8 | 0.8 |
| Substrate wetting agents - 8 | 0.5 | 0.5 | 0.5 | 0.5 |
| DER 331 - 9 | 12 | 0 | 0 | 0 |
| CTBN Rubber Modified Epoxy - 10 | 0 | 12 | 0 | 0 |
| Dimer acid modified Epoxy - 11 | 0 | 0 | 12 | 0 |
| Polybutadiene rubber modified Epoxy - 12 | 0 | 0 | 0 | 12 |
| Mica - 13 | 20 | 20 | 20 | 20 |
| Calcium Oxide - 14 | 2.0 | 2.3 | 2.3 | 2.3 |
| Fumed silica - 15 | 0.5 | 0.5 | 0.5 | 0.5 |
| Zinc Oxide - 16 | 1.5 | 1.5 | 1.5 | 1.5 |
| Carbon Black - 17 | 0.2 | 0.2 | 0.2 | 0.2 |
| PCC - 18 | 4 | 4 | 4 | 4 |

TABLE 2B

| Raw material | Chemical description |
|---|---|
| PVC - 1 | PVC resin homopolymer |
| PVC - 2 | PVC resin copolymer |
| Curing agent - 3 | Dicyandiamide |
| Accelerator - 4 | Phenyl urea |

TABLE 2B-continued

| Raw material | Chemical description |
|---|---|
| Plasticizer 1 - 5 | Alkyl (C12) Benzyl Phthalate |
| Plasticizer 2 - 6 | Linear Phthalate plasticizer |
| Adhesion promoter - 7 | 3-Glycidoxypropyltrimethoxysilane |
| Substrate wetting agents - 8 | Solution of a silicone-modified polyacrylate |
| DER 331- 9 | Diglicydyl ether of bisphenol A resin |
| CTBN Rubber Modified epoxy - 10 | CTBN Diglicydyl ether of bisphenol A adduct |
| Dimer acid modified Epoxy - 11 | Dimer Acid Diglicydyl ether of bisphenol A adduct |
| Polybutadiene rubber modified Epoxy - 12 | Hydroxy terminated, epoxidized polybutadiene resin. |
| Mica - 13 | Hydated phyosilicate mineral of aluminum and potassium |
| Calcium Oxide - 14 | Calcium oxide |
| Fumed Silica - 15 | Hydrophilic fumed silica |
| Zinc Oxide - 16 | Zinc oxide |
| Carbon black - 17 | Carbon black |
| PCC - 18 | Precipitated coated calcium carbonate |

1. PVC Homopolymer resin - Vestolit E 7033
2. PVC copolymer resin - Vinnolit 1062/7
3. Amicure CG1200
4. Amicure UR
5. Santicizer 278
6. Jayflex L9P
7. Silquest A 187
8. BYK 3550
9. Dow Epoxy resin -D.E.R 331
10. Polydis 3605
11. Hypox DA 323
12. Poly BD 605E
13. Mica 325
14. Calcium oxide
15. Fumed silica - Aerosil 208
18. PCC - Ultrapflex 100

TABLE 3

Test Results

| Test properties | Exp 1 | Exp 2 | Exp 3 | Exp 4 |
|---|---|---|---|---|
| Density | 1.35 | 1.34 | 1.38 | 1.36 |
| Viscosity (Pa·s) | 300 | 440 | 380 | 360 |
| Elongation % (ASTM D 638) | 60% | 70% | 68% | 80% |
| Tensile strength (ASTM D 638) | 7.0 Mpa | 6.5 Mpa | 6.2 Mpa | 4.0 Mpa |
| T peel Adhesion on Oily HDG metal | 50% C. F | 100% C. F | 90% A. F | 100% A. F |
| T peel Adhesion on Oily Aluminum metal | 50% C. F | 100% C. F | 90% A. F | 100% A. F |
| Flexibility after −30° C. bend test | crack, Material chip off form Metal, Adhesive failure | No crack, good Adhesion on metal | No crack, Adhesion failure | No crack, Adhesion failure |
| Corrosion resistance (480 Hrs salt spray) | No undercut corrosion | No undercut corrosion | Undercut corrosion | Undercut corrosion |
| Obrest bar Composite Loss Factor, Thickness 2 mm, at 25° C. | 0.11 | 0.22 | 0.14 | 0.13 |
| Impact Adhesion on Oily HDG | Cracking, delamination from the test panel, | No cracking and No delamination from the test panel | No cracking, delamination from the test panel | No cracking, delamination from the test panel |

TABLE 4

Conventional LASD and Non-Aqueous Sound Dampening Coating Properties Comparison

| Typical properties | Conventional Water based LASD | Present Invention Dampening Coating |
|---|---|---|
| Density | 1.6-1.7 g/cm3 | 1.3-1.4 g/cm3 |
| Solid content | 60-70% | 99.9% |
| E coat metal adhesion | Suitable | Suitable |
| Bare metal adhesion (Oily substrate adhesion) | Not suitable | Suitable |
| Bake condition | 130° C./20 minutes (Paint oven bake) | 160° C./15 minutes (E coat oven bake) |
| Blisters | Pita effect/Small blisters | None |
| Water absorption (after 7 days) | 1-2% | 0.2% |
| Obrest bar Composite Loss Factor, Thickness 2 mm, at 25° C., 200 Hz | 0.12-0.14 | 0.22 |

T Peel Adhesion Test Panel Preparation

Metal coupons of hot-dipped galvanized steel (HDG) were cleaned with acetone and wiped with a paper towel before being coated with 3 g/m$^2$ of FERROCOTE 61MALHCL-1 oil on one side. The coating composition was then applied to the oiled side of the coupon. Glass beads (0.25 mm) were sprinkled on top of the coating layer before bonding the T-peel coupons (25 mm×75 mm). Metal clips were used to hold the two coupons together during the baking process. All coupon assemblies were cured in accordance with the following bake schedule: 160° C./15 minutes metal temperature and other set coupons bake at 190° C./60 minutes metal temperature. After the bakes were completed, the coupons were allowed to sit at room temperature for 60 minutes. Cured T-peel assemblies were pulled on an Instron tester at a speed of 100 mm/minute. The average load at area was used to calculate peel strength. Test results are shown in FIG. 3.

TABLE 5

Obrest bar Composite Loss Factor
Substrate: 0.7 mm CRS steel
Test method: SAE J1637, Coating thickness 1 mm,
Test at −20° C. to 55° C.

|  | Temperature | Bake 160° C./15 minutes | | | Bake 190° C./60 minutes | | |
| --- | --- | --- | --- | --- | --- | --- | --- |
|  | (° C.) | 200 HZ | 400 HZ | 800 HZ | 200 HZ | 400 HZ | 800 HZ |
| Composite | −20 | 0.0119 | 0.009 | 0.0092 | 0.0125 | 0.0138 | 0.0133 |
| Loss factor | −5 | 0.0261 | 0.0231 | 0.0203 | 0.0326 | 0.0317 | 0.0332 |
|  | 10 | 0.0478 | 0.0494 | 0.051 | 0.0574 | 0.0538 | 0.058 |
|  | 25 | 0.12 | 0.124 | 0.127 | 0.123 | 0.132 | 0.137 |
|  | 40 | 0.06 | 0.078 | 0.07 | 0.071 | 0.0783 | 0.0742 |
|  | 55 | 0.01 | 0.012 | 0.013 | 0.0194 | 0.0189 | 0.0195 |

Figure 4:
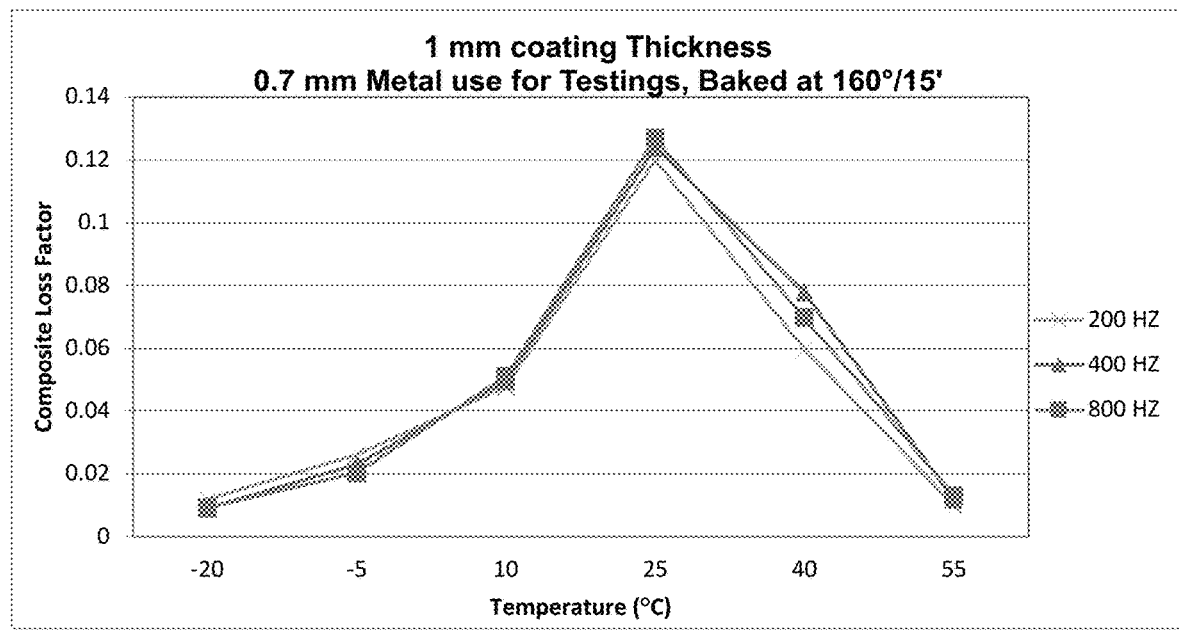
Figure 5:
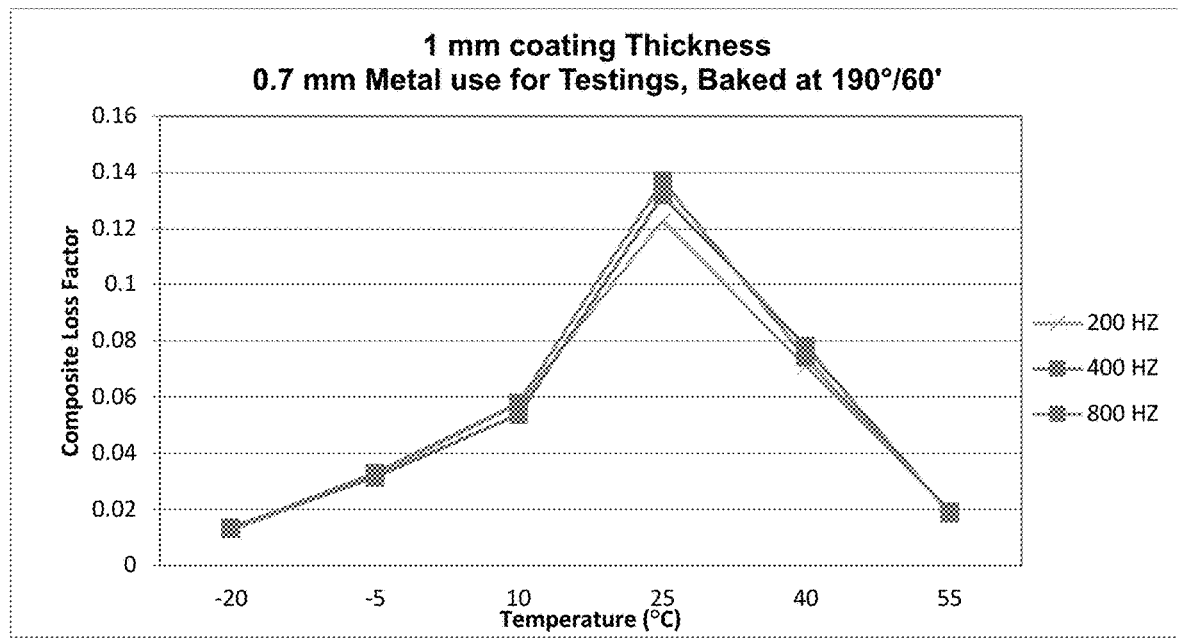

Graphical test results are shown in FIGS. 4-5.

TABLE 6

Obrest bar Composite Loss Factor
Substrate: 0.7 mm CRS steel
Test method: SAE J1637, Coating thickness 2 mm,
Test at −20° C to 55° C.

|  | Temperature | Bake 160° C./15 minutes | | | Bake 190° C./60 minutes | | |
| --- | --- | --- | --- | --- | --- | --- | --- |
|  | (° C.) | 200 HZ | 400 HZ | 800 HZ | 200 HZ | 400 HZ | 800 HZ |
| Composite | −20 | 0.0277 | 0.0310 | 0.0377 | 0.0277 | 0.0310 | 0.0377 |
| Loss factor | −5 | 0.0510 | 0.0570 | 0.0478 | 0.0510 | 0.0570 | 0.0478 |
|  | 10 | 0.0915 | 0.0980 | 0.1122 | 0.0915 | 0.0980 | 0.1122 |
|  | 25 | 0.2267 | 0.2345 | 0.2300 | 0.2267 | 0.2345 | 0.2300 |
|  | 40 | 0.1107 | 0.1151 | 0.1277 | 0.1107 | 0.1151 | 0.1277 |
|  | 55 | 0.0331 | 0.0401 | 0.0551 | 0.0331 | 0.0401 | 0.0551 |

Figure 6:
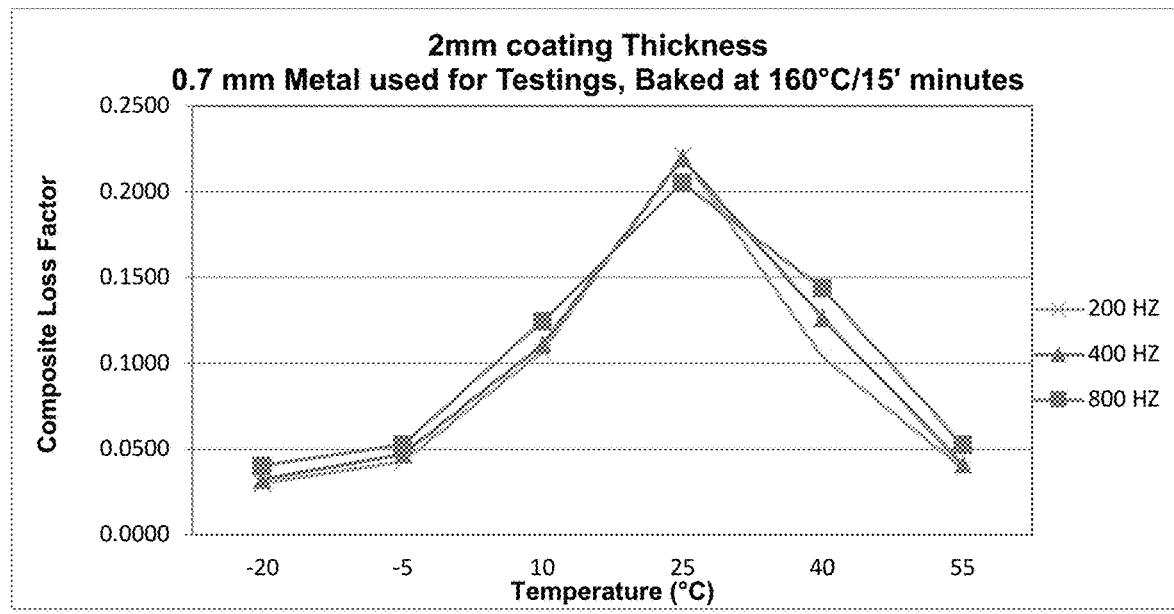
Figure 7:
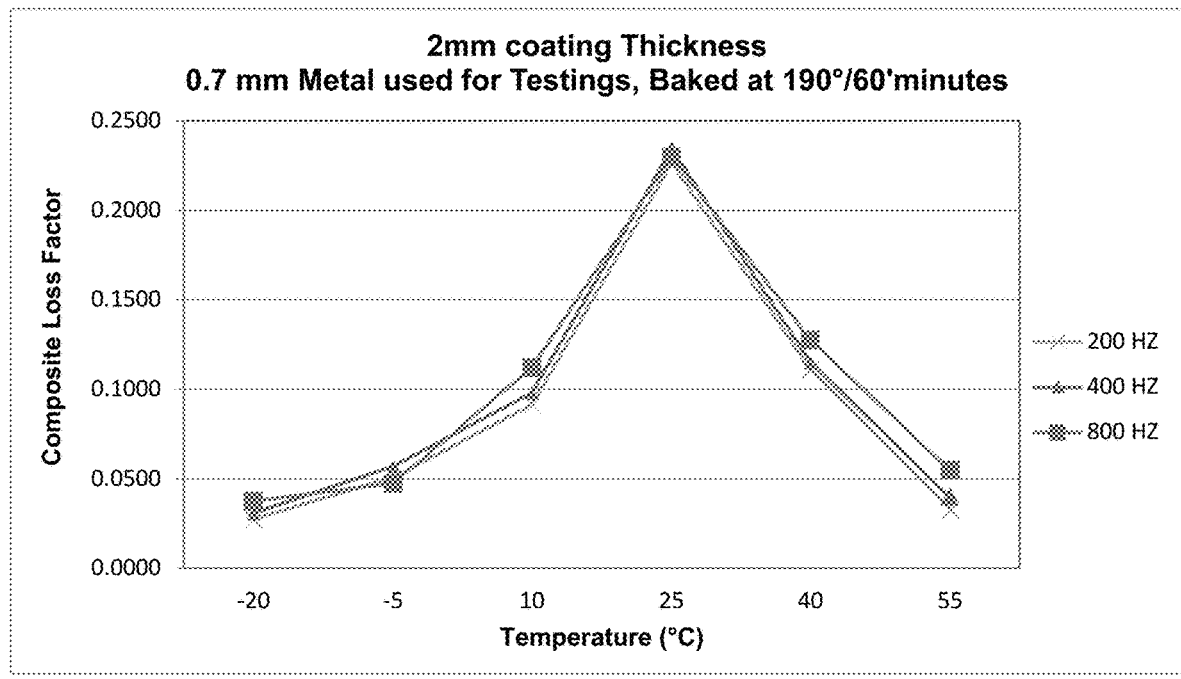

Graphical test results are shown in FIGS. 6-7.

TABLE 7

Obrest bar Composite Loss Factor
Substrate: 0.7 mm CRS steel
Test method: SAE J1637, Coating thickness 3 mm,
Test at −20° C to 55° C.

|  | Temperature | Bake 160° C./15 minutes | | | Bake 190° C./60 minutes | | |
| --- | --- | --- | --- | --- | --- | --- | --- |
|  | (° C.) | 200 HZ | 400 HZ | 800 HZ | 200 HZ | 400 HZ | 800 HZ |
| Composite | −20 | 0.0371 | 0.0346 | 0.0397 | 0.0365 | 0.0342 | 0.0292 |
| Loss factor | −5 | 0.0511 | 0.0524 | 0.0604 | 0.0499 | 0.0537 | 0.0632 |
|  | 10 | 0.1328 | 0.1373 | 0.1393 | 0.1423 | 0.1436 | 0.1399 |
|  | 25 | 0.2492 | 0.2567 | 0.2699 | 0.2460 | 0.2553 | 0.2471 |
|  | 40 | 0.1625 | 0.1806 | 0.2049 | 0.1635 | 0.1796 | 0.1765 |
|  | 55 | 0.0456 | 0.0681 | 0.0883 | 0.0521 | 0.0688 | 0.0814 |

Figure 8:
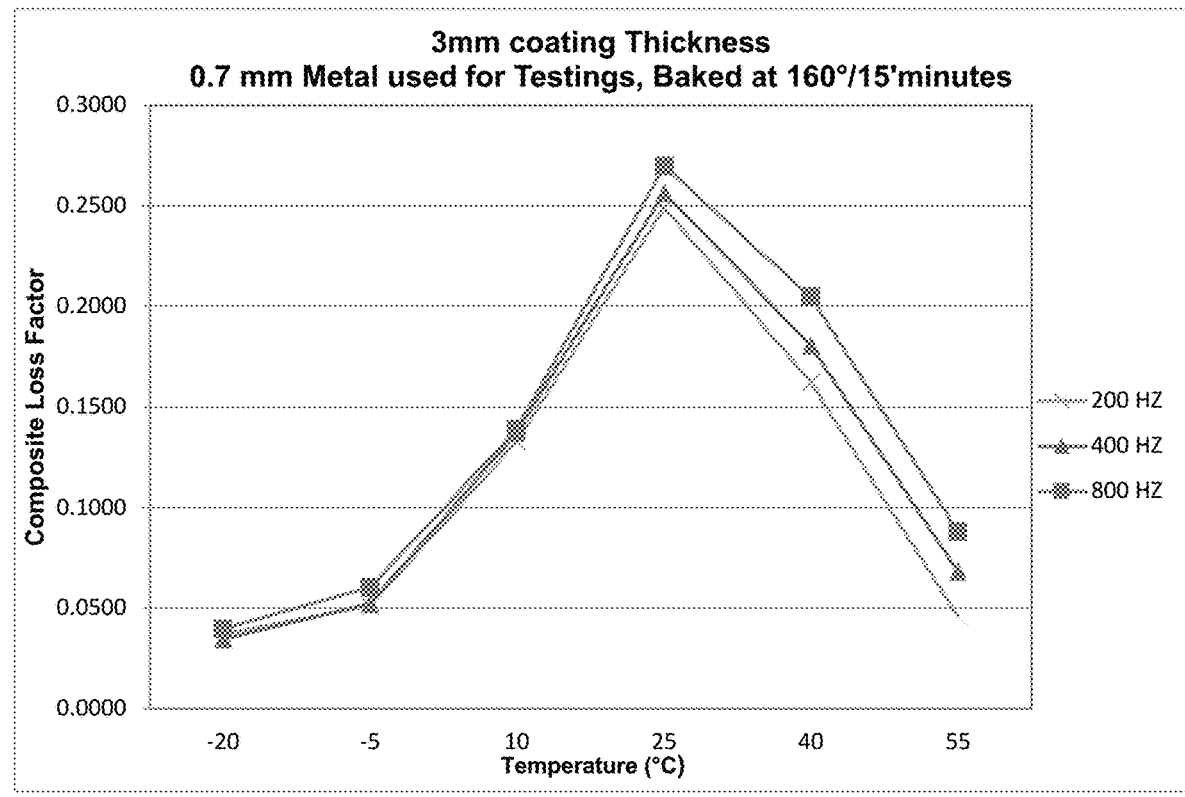
Figure 9:
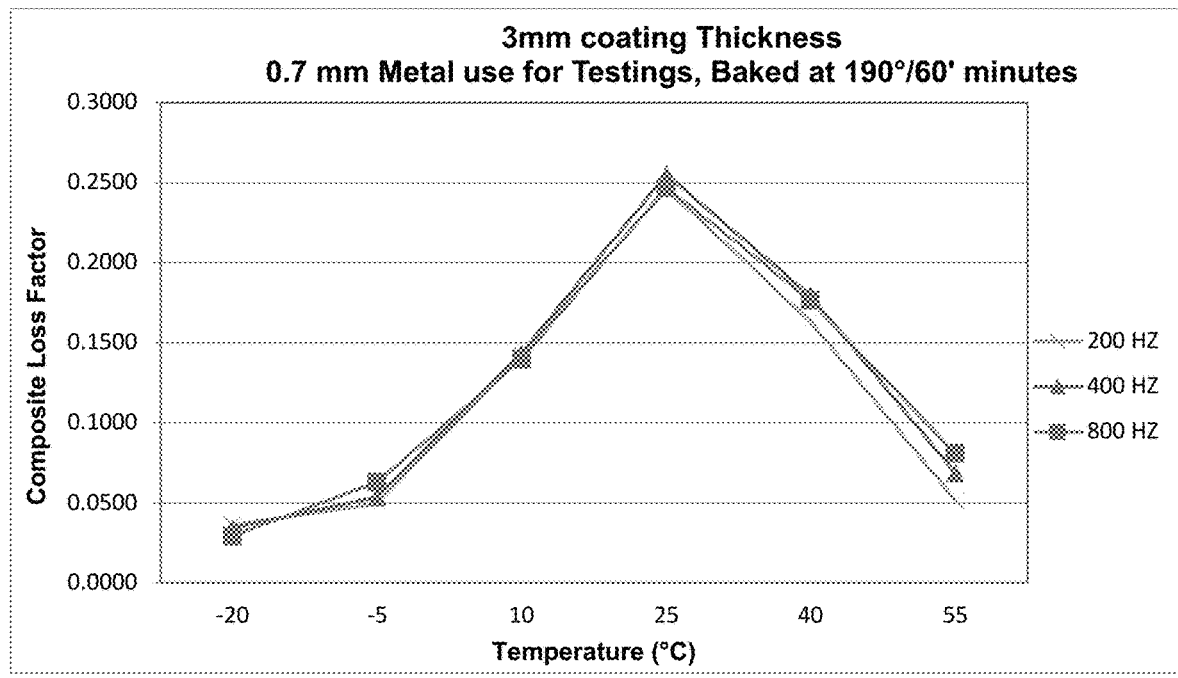

Graphical test results are shown in FIGS. 8-9.

TABLE 8

Obrest bar Composite Loss Factor
Substrate: 0.7 mm CRS steel
Test method: SAE J1637, Coating thickness 4 mm,
Test at −20° C to 55° C.

| | Temperature | Bake 160° C./15 minutes | | | Bake 190° C./60 minutes | | |
|---|---|---|---|---|---|---|---|
| | (° C.) | 200 HZ | 400 HZ | 800 HZ | 200 HZ | 400 HZ | 800 HZ |
| Composite Loss factor | −20 | 0.0419 | 0.0463 | 0.0479 | 0.0376 | 0.0368 | 0.0436 |
| | −5 | 0.0530 | 0.0597 | 0.0592 | 0.0508 | 0.0512 | 0.0670 |
| | 10 | 0.1571 | 0.1535 | 0.1557 | 0.1324 | 0.1366 | 0.1421 |
| | 25 | 0.2831 | 0.2685 | 0.2619 | 0.2856 | 0.2741 | 0.2778 |
| | 40 | 0.2319 | 0.2479 | 0.2401 | 0.1840 | 0.1863 | 0.1769 |
| | 55 | 0.0696 | 0.0974 | 0.1243 | 0.0531 | 0.0769 | 0.0743 |

Graphical test results are shown in FIGS. 10-11.

Graphical test results comparing CLF as a function of thickness are shown in FIG. 12

The foregoing description merely explains and illustrates the invention and the invention is not limited thereto except insofar as the appended claims are so limited, as those skilled in the art who have the disclosure before them will be able to make modifications without departing from the scope of the invention.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etcetera shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etcetera. As a non-limiting example, each range discussed herein can be readily broken down into a lower third, middle third and upper third, etcetera. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed and desired to be secured by Letters Patent of the United States is:

1. A non-aqueous sprayable and curable dampening composition for automotive body and closure panels which cures to form a cured product, comprising:
   a PVC homopolymer resin and/or a mixture of a PVC copolymer resin;
   a phthalate plasticizer and a benzoate plasticizer;
   a filler component, wherein the filler component comprises one or more spherical filler(s) and/or one or more platy filler(s);
   a modified epoxy resin;
   an adhesion promoter, wherein the adhesion promoter comprises an epoxy-based silane; and
   a substrate wetting agent.

2. The composition according to claim 1, wherein the composition is solvent free.

3. The composition according to claim 1, wherein the PVC homopolymer/copolymer resin is present in a concentration ranging from approximately 20 percent by weight to approximately 40 percent by weight.

4. The composition according to claim 1, wherein the plasticizers are present in a concentration ranging from approximately 20 percent by weight to approximately 50 percent by weight.

5. The composition according to claim 1, wherein the filler component is present in a concentration ranging from approximately 15 percent by weight to approximately 50 percent by weight.

6. The composition according to claim 1, wherein the modified epoxy resin is present in a concentration ranging from approximately 3 percent by weight to approximately 15 percent by weight.

7. The composition according to claim 1, wherein the adhesion promoter is present in a concentration ranging from approximately 1 percent by weight to approximately 5 percent by weight.

8. The composition according to claim 1, wherein the substrate wetting agent is present in a concentration ranging from approximately 0.1 percent by weight to approximately 3.0 percent by weight.

9. The composition according to claim 1, wherein the PVC homopolymer/copolymer resin comprises an average molecular weight ranging from approximately 60,000 Daltons to approximately 200,000 Daltons.

10. The composition according to claim 1, wherein the phthalate plasticizer comprises a diisononyl phthalate and the benzoate plasticizer comprises a dibenzoate plasticizer.

11. The composition according to claim 1, wherein the weight ratio of platy filler to spherical filler is approximately 20:1.

12. The composition according to claim 1, wherein the modified epoxy resin comprises a Bisphenol A and/or a Bisphenol F based epoxy resin.

13. The composition according to claim 1, wherein the substrate wetting agent comprises a silicone-modified polyacrylate.

14. The composition according to claim 1, further comprising a fumed silica thixotropic filler.

15. The composition according to claim 1, further comprising a curing agent, wherein the curing agent comprises a dicyanamide.

16. The composition according to claim 1, further comprising a curing accelerator, wherein the curing accelerator comprises a substituted phenyl urea.

17. The composition according to claim 1, further comprising a moisture scavenger, wherein the moisture scavenger comprises calcium oxide and/or zinc oxide.

18. A method for using a curable dampening composition, comprising the steps of:
   (a) providing a curable dampening composition comprising:
      (1) a PVC homopolymer resin and/or a mixture of a PVC copolymer resin;
      (2) a phthalate plasticizer and a benzoate plasticizer;
      (3) a filler component, wherein the filler component comprises one or more spherical filler(s) and one or more platy filler(s);
      (4) a modified epoxy resin;
      (5) an adhesion promoter, wherein the adhesion promoter comprises an epoxy-based silane; and
      (6) a substrate wetting agent;
   (b) spraying a coating of the composition onto a substrate; and
   (c) curing the coating of the composition on the substrate such that the cured composition comprises an interpenetrating network of a cured epoxy modified rubber and cured PVC resin.

19. The method according to claim 18, wherein the step of curing includes the step of heating the substrate and composition to a temperature ranging from approximately 130 degrees Centigrade to approximately 190 degrees Centigrade for approximately 10 minutes to approximately 60 minutes.

20. The method according to claim 18, wherein the step of spraying includes spraying the coating of the composition onto an oily substrate.

21. The method according to claim 18, wherein the cured coating composition comprises a thickness ranging from approximately 1.0 mm to approximately 5.0 mm.

22. The method according to claim 18, wherein the curable composition comprises a viscosity of approximately 600 pascal-second or less and can be sprayed to form a cured coating composition which has a greater than 0.200 Obrest dissipation composite loss factor as measured at 200 Hz at 25° C. with 2 mm thickness in accordance with SAE J1637.

23. The method according to claim 18, wherein the cured coating composition comprises a density of equal to or less than approximately 1.4 g/cc.

24. The method according to claim 18, wherein the cured coating composition comprises an elongation equal to or less than approximately 100%.

25. The method according to claim 18, wherein the cured coating composition comprises a tensile strength equal to or less than approximately 7 Mpa.

\* \* \* \* \*